United States Patent
O'Leary et al.

(10) Patent No.: US 6,887,027 B2
(45) Date of Patent: May 3, 2005

(54) SCOOTER LIFT WITH LOAD DETECTOR AND LOAD LOCK

(75) Inventors: Neil Brendon O'Leary, Tempe, AZ (US); William E. Gest, Fountain Hills, AZ (US)

(73) Assignee: Vantage Mobility International LLC, Phoenix, AZ (US)

( * ) Notice: Subject to any disclaimer, the term of this patent is extended or adjusted under 35 U.S.C. 154(b) by 94 days.

(21) Appl. No.: 10/022,658

(22) Filed: Dec. 17, 2001

(65) Prior Publication Data

US 2003/0113196 A1 Jun. 19, 2003

(51) Int. Cl.[7] .................................................. B60P 3/06
(52) U.S. Cl. ...................................... 414/462; 414/540
(58) Field of Search ................................. 414/462, 540

(56) References Cited

U.S. PATENT DOCUMENTS

| | | | | |
|---|---|---|---|---|
| 4,353,436 A | * | 10/1982 | Rice et al. ................... | 414/540 |
| 4,609,025 A | * | 9/1986 | Messenger ..................... | 157/1 |
| 4,815,638 A | * | 3/1989 | Hutyra ......................... | 224/525 |
| 5,011,361 A | * | 4/1991 | Peterson ....................... | 414/462 |
| 5,137,411 A | * | 8/1992 | Eul et al. ..................... | 414/462 |
| 5,180,275 A | * | 1/1993 | Czech et al. ................. | 414/541 |
| 5,431,522 A | * | 7/1995 | Ross ........................... | 414/462 |
| 5,567,107 A | * | 10/1996 | Bruno et al. ................ | 414/462 |
| 5,816,763 A | * | 10/1998 | Hamann et al. ............ | 414/462 |
| 5,846,047 A | * | 12/1998 | Riekki ......................... | 414/494 |
| 6,139,247 A | * | 10/2000 | Wright ........................ | 414/462 |
| 6,386,817 B1 | * | 5/2002 | Cash ........................... | 414/462 |
| 2001/0036395 A1 | * | 11/2001 | Talbott | |

\* cited by examiner

*Primary Examiner*—Janice L. Krizek
(74) *Attorney, Agent, or Firm*—Paul F. Wille

(57) ABSTRACT

An external lift for a scooter includes a load sensor actuated by rotation of the platform as a load is applied anywhere on the platform, a lock mechanism for preventing the platform from rotating in a loaded and raised position, and a lock mechanism for preventing the platform from rotating in an unloaded and raised position. A pair of shoes on a hold down prevent a scooter from leaving the lift unintendedly. The lift includes a fixed post and a moveable post. A roller coupled to the moveable post engages a small ramp on the end of the fixed post, thereby further stabilizing the lift and increasing the lifting capacity.

10 Claims, 4 Drawing Sheets

SCOOTER LIFT WITH LOAD DETECTOR AND LOAD LOCK

BACKGROUND OF THE INVENTION

This invention relates to a scooter lift for a vehicle and, in particular, to an improved external lift for loading and transporting a scooter safely.

A variety of small motorized scooters have been developed to carry a seated person through areas intended for pedestrian traffic. These scooters are battery powered, ride on either three or four small wheels, and are relatively compact but can be rather heavy because of the battery and electric motor. Unlike powered or unpowered wheelchairs, motorized scooters are usually not driven into a van or other vehicle with a person seated on the scooter. Rather, a lift is provided for attaching a scooter to the vehicle for traveling long distances. Such lifts are either external, as illustrated in U.S. Pat. No. 5,011,361 (Peterson) and U.S. Pat. No. 5,567,107 (Bruno), or internal. External lifts typically have a fold-down platform for receiving a scooter. An internal lift is essentially a small derrick mounted in the rear portion of a van. This invention relates to an external lift having an improved load sensor and improved carriage.

External lifts typically include a horizontal square steel tube that fits within the receiver of a trailer hitch on a vehicle. A vertical post is welded to the tube and the rest of the lift is attached to the post in a series of joints. For example, an adjustable sleeve is attached to the vertical post to enable vertical adjustment of the platform. A lift mechanism is attached to the sleeve and to a horizontal hinge. The platform is attached to the movable part of the hinge, about which the platform rotates. There is a problem in that the joints flex or twist as loads are applied. The result is a constant rattling as one drives down the road, whether a scooter is loaded or not, particularly if not.

Any mechanical system subjected to vibration has a frequency at which energy is preferentially absorbed, i.e. a resonant frequency. It has been found that the combination of vehicle, lift, and scooter may have a resonant frequency at frequencies less than 10 Hz, particularly less than 1 Hz. Encountering the right source of vibration depends heavily upon the suspension of the vehicle and the type of road, which are difficult to predict. However, under rare but favorable conditions, a resonance can be set up that increases in amplitude enough to throw a scooter from a lift during transport, even with the hold-down typically used to clamp the scooter to the platform.

A problem with any external lift is the fact that, when loaded with a scooter, a considerable weight is being added a long distance behind the rear wheels of a vehicle. Particularly for smaller vehicles, wherein the weight of the scooter is a greater fraction of the total weight of the vehicle, any instability in the load adversely affects the handling of the vehicle. The effect is very much one of "the tail wagging the dog." However picturesque the metaphor, the effect can be quite unsettling for a driver and, perhaps, unsafe.

It is known in the art to incorporate a load sensor into the platform, e.g. as disclosed in the Peterson patent. A problem with load sensors of the prior art is that the sensor is activated by a wheel of the scooter. Thus, the sensor is not just exposed to the elements but is exposed to dirt, stones, and whatever other debris may be adhering to the wheels of the scooter.

Another problem with sensors of the prior art is that the sensor mechanism includes a long coupling past the hinge about which the platform rotates. Because the sensor is located at or near ground level, in order for a wheel to roll over the sensor, the coupling mechanism is also exposed to dirt, mud, and damage. If the platform is lowered over uneven ground or ground strewn with rocks, twigs, or other debris, the treadle for the sensor may be supported and not depress when the wheel of a scooter rolls over the sensor. Finally, load sensors of the prior art typically sense a load at a small location. If a child stands on the lift, it is not likely that the child will stand on the load sensor. Thus, a child could actuate the lift and have the platform fold up with the child on it.

In view of the foregoing, it is therefore an object of the invention to provide an external scooter lift with a load sensor that senses a load anywhere on the scooter platform.

Another object of the invention is to provide a load sensor that is protected from the wheels of a scooter.

A further object of the invention is to provide a lift that minimizes motion of the platform during transport.

A further object of the invention is to minimize adversely affecting the handling of a vehicle loaded with an external scooter.

Another object of the invention is to prevent resonance effects in scooter lifts.

A further object of the invention is to secure a scooter to a lift even if the vehicle carrying the scooter is bounding down a road.

SUMMARY OF THE INVENTION

The foregoing objects are achieved in this invention in which an external lift for a scooter includes a load sensor actuated by rotation of the platform as a load is applied, a lock mechanism for preventing the platform from rotating in a loaded and raised position, and a lock mechanism for preventing the platform from rotating in an unloaded and raised position. The load sensor is attached to the hinge that enables the platform to rotate and includes a first plate coupled to the frame of the lift, a second plate coupled to the platform and approximately parallel with the first plate when the platform is horizontal. A compression spring separates the first plate from the second plate, whereby said platform is supported in an approximately horizontal position by the spring. A load on said platform causes the separation of the first plate from the second plate to decrease. The change is separation is sensed and an interlock is opened to prevent rotation of the platform as the platform is raised. A pin through the hinge prevents the platform from rotating in a raised position. A pair of shoes on a hold down prevent a scooter from leaving the lift unintendedly.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
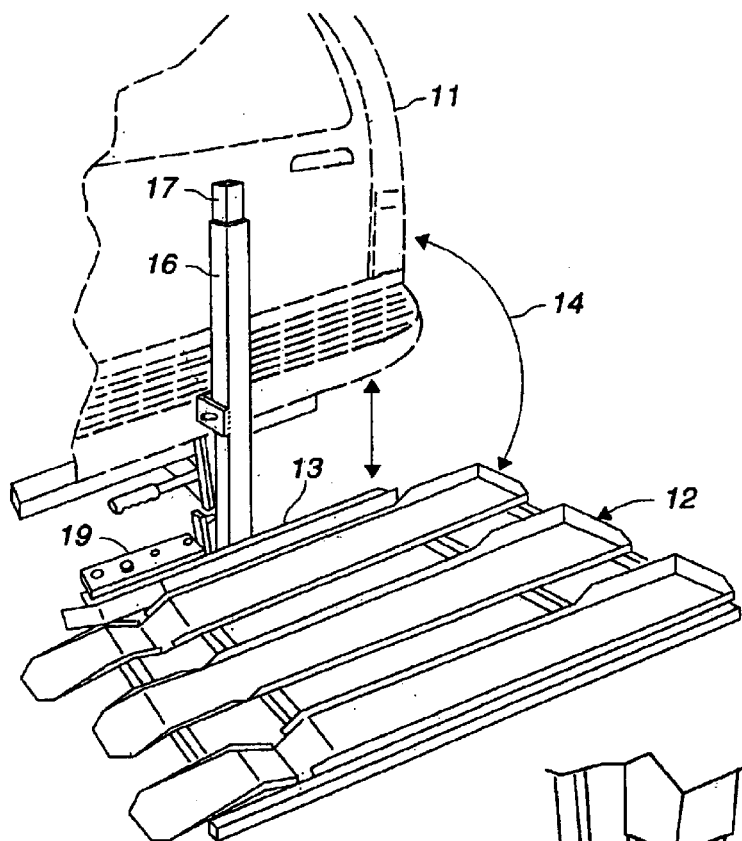
FIG. 1 is a perspective view of a stroller lift attached to the rear of a vehicle.

FIG. 1 illustrates a scooter lift constructed in accordance with the invention mounted on the rear of vehicle 11 by a trailer hitch. Platform 12 pivots about hinge 13 from a vertical to a horizontal position, and back, as indicated by double ended arrow 14. Steel tube 16 is welded to a horizontal steel tube (not shown in FIG. 1) that fits within the receiver for the trailer hitch on vehicle 11. Sliding post 17 fits within tube 16 and is driven by a suitable source of power (not shown) to raise or lower platform 12, which is mechanically coupled to the lower end of the sliding post.

Figure 2:
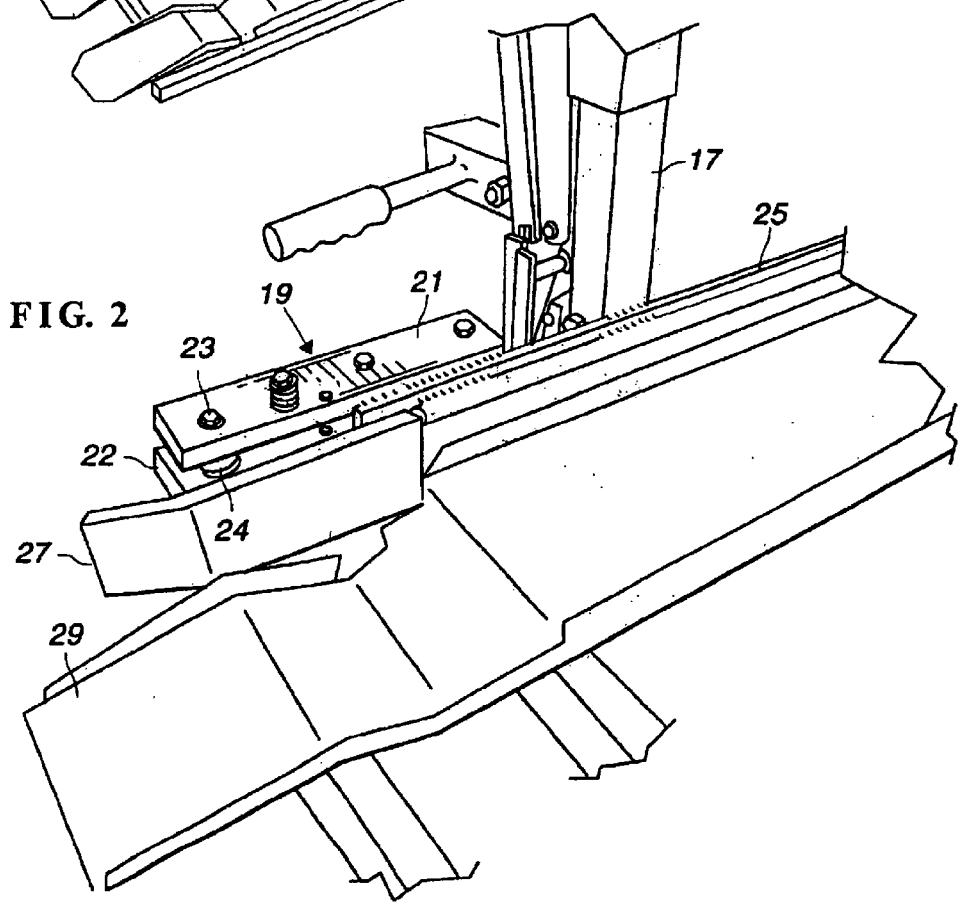
FIG. 2 is a detail perspective of a load sensor constructed in accordance with the invention located adjacent the platform of the scooter lift.

Load sensor 19 is attached to the rear of hinge structure for supporting platform 12. Referring to FIG. 2, load sensor 19 includes first plate 21 and second plate 22 that operate somewhat like the pivoting jaws of pliers to compress load spring 24. First plate 21 is welded or otherwise attached to beam 25, which is welded or otherwise suitable attached to sliding post 17. Second plate 22 is attached to the platform and coupled to first plate 21 by spring 24. Spring 24 is preferably a coil spring and is compressed between the first plate and the second plate when the platform is rotated to a horizontal position. Spring 24 provides a sufficient restoring force that it can riot be completely compressed by the weight of the platform. Strictly speaking, the torque of the platform about the hinge is opposed by the torque from load spring 24. Although a single spring is shown, more than one spring can be used to counter the torque from the platform. The upper end of spring 24 is attached to first plate 21 by bolt 23. The load sensor is protected from the wheels of a scooter by fence 27, which also guides the wheels of a scooter onto track 29.

Figure 3:
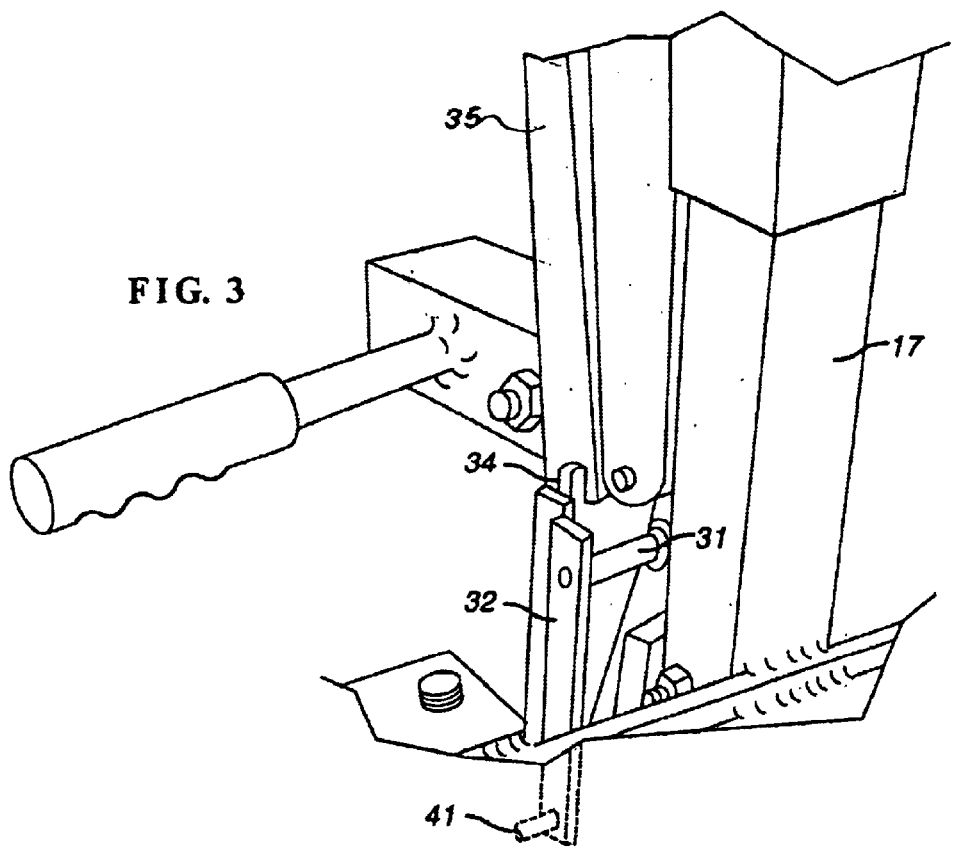
FIG. 3 is a detail of the catch used for tilting the platform.

The platform for a scooter rotates to a vertical position for travel, unless a scooter is on the platform. Referring to FIG. 3, whether or not the platform rotates depends upon whether or not pin 31 on the end of lever 32 engages slot 34 at the end of arm 35. If pin 31 engages slot 34, then the platform rotates as it is raised. If pin 31 does not engage slot 34, then the platform remains horizontal as it is raised.

Figure 4:
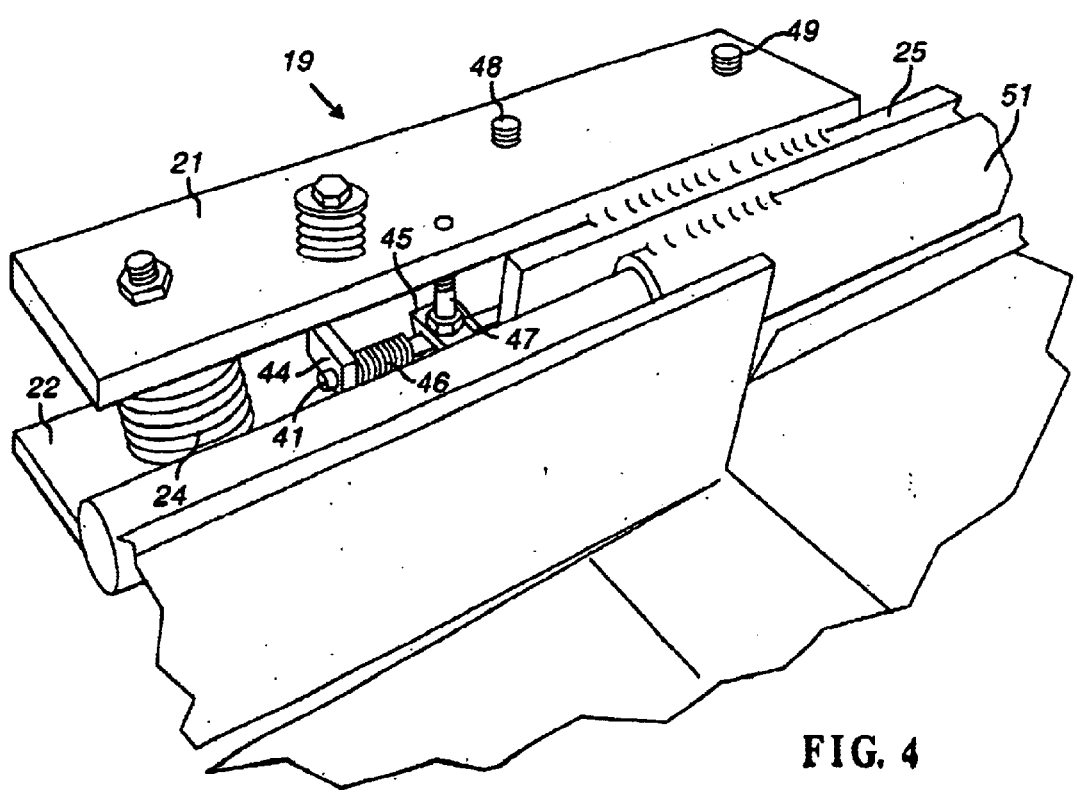
FIG. 4 is a detail of the load sensor.

Lever 32 is movable and rotates about a shaft at the lower end thereof. In FIG. 4, shaft 41 extends along the rear of the platform from within load sensor 19 almost to post 17. Lever 32 (FIG. 3) is attached near one end of shaft 41. The other end of shaft 41 is journaled in support bracket 44, which is attached to plate 22. Angle iron is welded or otherwise suitably attached to shaft 41 to form tab 45 extending away from the long dimension of the shaft. Return spring 46 applies a torque to shaft 41, turning lever 32 into position for pin 31 to engage slot 34. Adjustable stop 47 is attached to plate 21 above tab 45. The adjustable stop, tab, and shaft provide an indication of the separation of plates 21 and 22.

If a torque greater than the torque due to the platform is applied to the system, then plates 21 and 22 move toward each other, spring 24 is further compressed, and tab 45 engages adjustable stop 47. When adjustable stop 47 engages tab 45, a torque is applied to shaft 41, opposing return spring 46 and pivoting arm 32 away from engagement between pin 31 and slot 34. A weight anywhere on the platform causes further compression of spring 24 and, therefore, prevents the platform from being rotated as it is raised. In one embodiment of the invention, as little as thirty pounds on the platform was sufficient to prevent the platform from rotating as it was raised.

Mechanical stops 48 and 49 prevent spring 24 from being unduly compressed. That is, plates 21 and 22 move enough to cause arm 32 (FIG. 3) to move out of alignment but not enough to cause the platform to droop.

Figure 5:
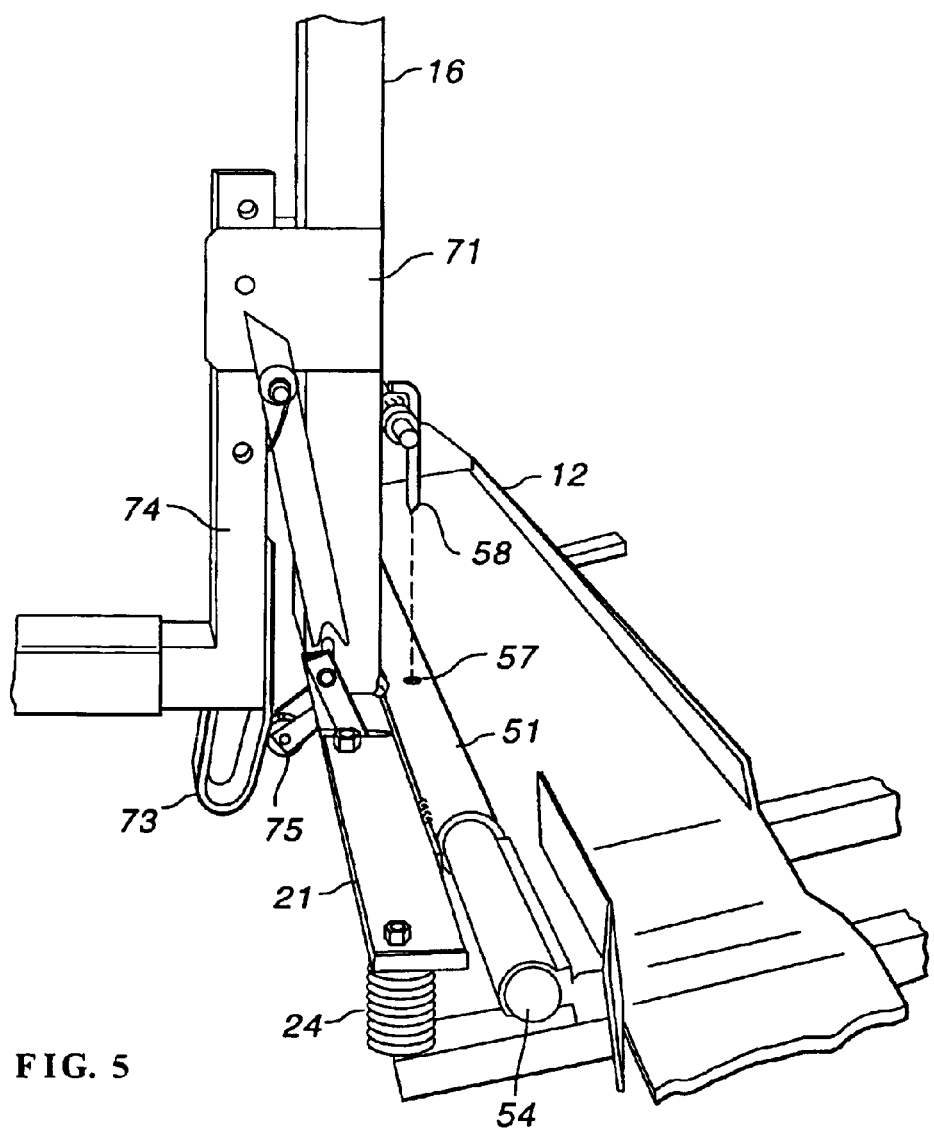
FIG. 5 is a perspective view illustrating a load lock constructed in accordance with the invention.
Figure 6:
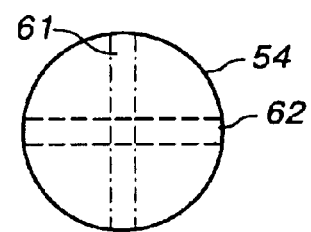
FIG. 6 is an end view of the bar used as the hinge pin for the platform.

FIG. 5 illustrates a scooter lift constructed in accordance with another aspect of the invention in which the platform is locked to prevent rotation during transport. The hinge about which platform 12 rotates includes steel tube 51 enclosing bar 54. Tube 51 is welded to upper plate 21 and to sliding post 17 (FIG. 3). Platform 12 is welded to bar 54. In accordance with this aspect of the invention, tube 51 includes hole 57 aligned with pin 58. Pin 58 is attached to tube 16 and, therefore, is fixed or stationary relative to platform 12. Bar 54 include at least one bore, such as bore 61 in FIG. 6. Preferably bore 61 extends through bar 54. When platform 12 is raised horizontally, pin 58 enters hole 57 and engages bore 61, thereby preventing platform 12 from rotating.

Second bore 62 through bar 54 is provided to receive pin 58 for transporting the lift with platform 12 in a vertical position. The bores are not necessarily at 90° as illustrated in the drawings but may be at some other angle to accommodate the position of platform 12 after rotation. It has been found that the lock mechanism shown in FIG. 5 has the added advantage of changing the resonant frequency of the system such that undue bouncing of the scooter is avoided.

In accordance with another aspect of the invention, which further provides a much stronger lift without greatly affecting the weight of the lift, U-shaped steel ramp 73 is attached to the lower end of post 74 for engaging wheel 75. Bracket 71, attached to the upper end of post 74 is subject to great strain when a load is placed on platform 12. Wheel 75 rides on ramp 73 to support the lower end of tube 16, greatly increasing the weight that can be lifted safely.

Figure 7:
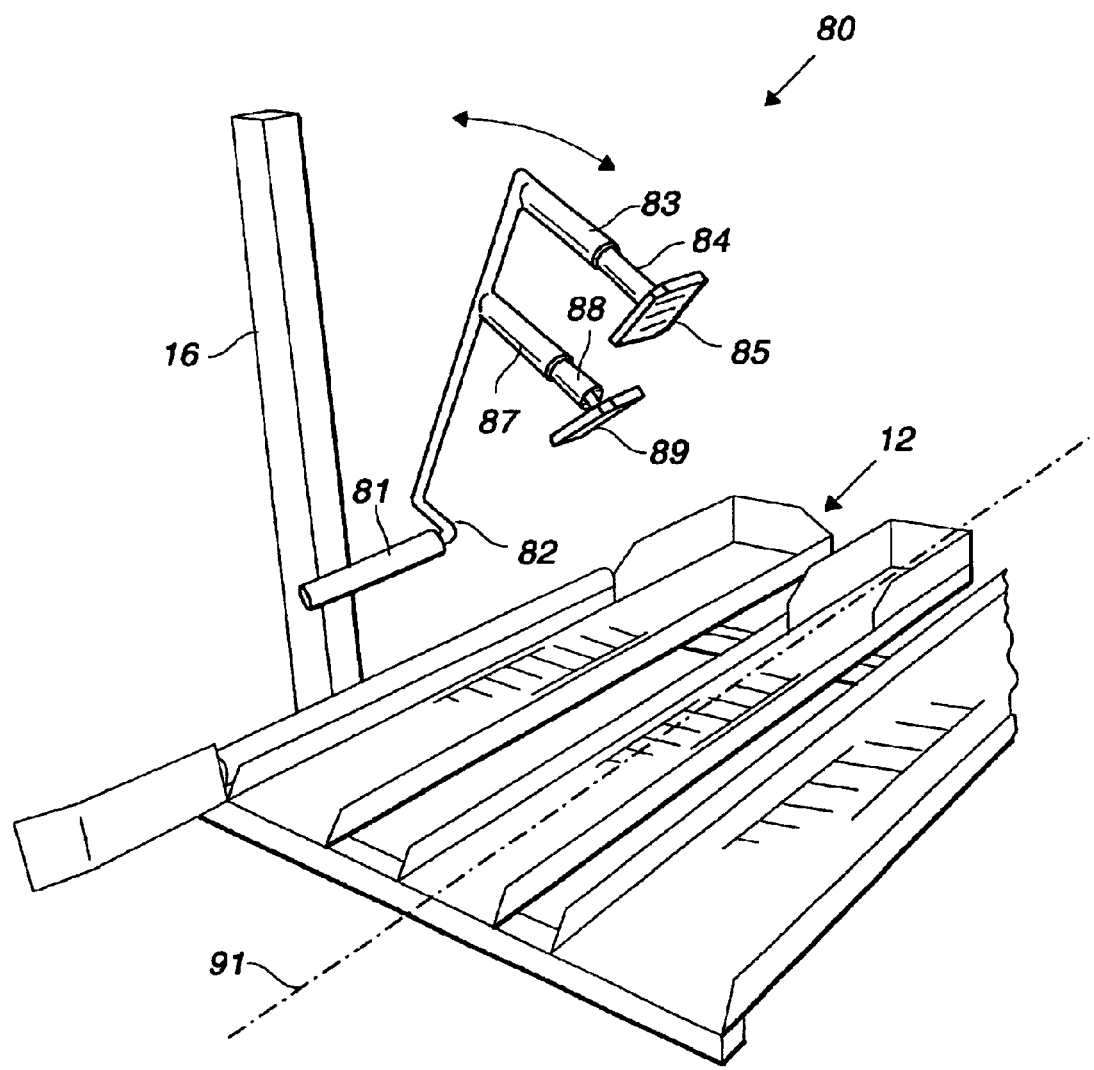
FIG. 7 is a perspective view of a hold down constructed in accordance with the invention.

FIG. 7 illustrates a hold down constructed in accordance with the invention in which a pair of laterally displaced feet are used hold down the scooter. Hold down 80 includes tube 81 welded or otherwise securely attached to tube 16. Tube 81 is approximately horizontal and receives one end of arm 82, which is preferably a bent, solid bar of steel. Arm 82 rotates within tube 81 to provide an up or down motion to the free end of the arm. Tube 83 is welded to the free end of arm 82 and tube 84 fits within tube 83 with a spring (not shown) to provide a resilient connection to foot 85, which is mounted on one end of tube 84. Along the length of arm 82 a second telescoping pair of tubes is welded to provide connection to foot 89. Feet 85 and 89 are preferably attached to tubes 84 and 88 by a mechanism that will allow some movement of the feet about at least two axes. As shown in the FIG. 7, foot 89 is attached by a ball and socket joint. Other mechanisms could be used instead.

Feet 85 and 89 are separated along arm 82 by 5–10 inches or more. The result is that the feet are laterally displaced, i.e. separated from side to side across a scooter. Preferably, the feet straddle longitudinal axis 81 of a scooter (not shown). Thus positioned, the feet prevent the scooter from rolling about longitudinal axis 91 during transport. To some extent, hold down 80 also prevents the scooter from rolling on its wheels. What is of concern here is rolling in the sense of the one of the motions of roll, pitch, and yaw.

The invention thus provides an external scooter lift with a load sensor that senses a load anywhere on the scooter platform yet the load sensor is protected from the wheels of a scooter. The invention further provides a more rugged lift by locking the platform in place for transport, thereby minimizing motion of the lift during transport, and by supporting the sliding post while the platform is raised or lowered, thereby minimizing flexing of joints and major components of the lift. The displaced feet on the hold down further prevent unwanted motion of the scooter during transport. The result is noticeably better handling of a vehicle carrying the scooter, particularly in smaller vehicles, no resonance effects, and a quieter ride.

Having thus described the invention, it will be apparent to those of skill in the art that various modifications can be made within the scope of the invention. For example, either pin 58 or bores 61 and 62 or all of them can be cylindrical or tapered. Instead of bolts 48 and 49 as stops, one could use a plate welded to the rear of plate 21. Such a plate would not only engage plate 22 along its entire length, rather than in just one or two places, it would also provide an enclosure for the load sensor. On the other hand, such a plate is fixed, requiring some adjustment in spring 24 to allow for variations in manufacture. A torsion spring or leaf spring can be used instead of a coil spring for spring 25. A torsion spring can be used for all or part of shaft 41. If the platform is locked only in the horizontal position, then means must be provided to move pin 58 out of position when the platform is in a vertical position. Pieces that are welded can be made as a single piece. Ancillary apparatus, such as a pawl and catch mechanism for operating the hold-down, is not shown but would be part of a scooter lift incorporating this invention. Such mechanisms are known in the art. One could provide feet on separate arms but this is needlessly complicated. Spring 24 operates in compression but could be made to operate in expansion by reversing the connections of plates 21 and 22 (attaching plate 21 to bar 54 and attaching plate 22 to tube 51) but this is not preferred. The particular construction of the hinge about which the platform rotates is not critical to the invention. For example, either a single bar or a segmented bar can be used and either the bar or the sleeve can be attached to the frame. Motive power for the lift is commercially available from several sources and, other than being able to lift four hundred pounds vertically a distance of eighteen inches, is not critical.

What is claimed as the invention is:

1. In an external lift for a scooter wherein the lift includes a post adapted to be attached to a vehicle and a rotating platform attached to the post, the improvement comprising:

a load sensor actuated by rotation of the platform as a load is applied said platform.

2. The lift as set forth in claim 1 and further including:

a lock mechanism for preventing the platform from rotating in a loaded and raised position.

3. The lift as set forth in claim 1 and further including:

a lock mechanism for preventing the platform from rotating in an unloaded and raised position.

4. The lift as set forth in claim 1 and further including:

a roller coupled to said platform and engaging a ramp on said post for supporting said platform while said platform is raised or lowered.

5. The lift as set forth in claim 1 and further including a hold down having two, laterally displaced feet.

6. In an external lift for a scooter wherein the lift includes a post adapted to be attached to a vehicle, a lift mechanism including a tube attached to said post and a sliding post fitting within said tube, and a rotating platform coupled to the sliding post by a hinge including a bar attached to said platform inside a horizontal tube coupled to said sliding post, the improvement comprising:

a first plate coupled to said tube;

a second plate coupled to said bar;

a first spring attached to at least said first plate for separating the first plate from the second plate;

whereby said platform is supported in an approximately horizontal position by said spring and a load on said platform causes the separation of the first plate from the second plate to decrease; and means for detecting a decrease in the separation of the first plate from the second plate.

7. An external scooter lift as set forth in claim 6 wherein said means includes:

a shaft rotatably mounted on said second plate;

a tab on said shaft extending away from the long dimension of the shaft;

an adjustable stop mounted on said first plate and positioned above said tab;

whereby said stop engages said tab as said first plate moves toward said second plate and causes said shaft to rotate.

8. An external scooter lift as set forth in claim 7 and further including:

a pin attached to said tube and extending downwardly;

a hole in said horizontal tube aligned with said pin; and a bore in said bar that aligns with said hole when said platform is raised in a horizontal position;

whereby said pin engages said hole and said bore, thereby preventing said bar from rotating.

9. In an external lift for a scooter wherein the lift includes a post adapted to be attached to a vehicle, a lift mechanism including a tube attached to said post and a sliding post fitting within said tube, and a rotating platform coupled to the sliding post by a hinge including a bar attached to said platform inside a horizontal tube coupled to said sliding post, the improvement comprising:

a bore in said bar and a pin attached to said post, wherein said pin engages said bore when said platform is in a raised position to prevent rotation of said platform.

10. The lift as set forth in claim 9 and further including a hold down having two, laterally displaced feet.

* * * * *